United States Patent [19]

Hasco

[11] Patent Number: 5,421,099
[45] Date of Patent: Jun. 6, 1995

[54] INSPECTION TOOL
[75] Inventor: Daryll A. Hasco, Newville, Pa.
[73] Assignee: The Whitaker Corporation, Wilmington, Del.
[21] Appl. No.: 171,047
[22] Filed: Dec. 21, 1993
[51] Int. Cl.⁶ ............................................. B23Q 16/00
[52] U.S. Cl. ........................................ 33/573; 33/568
[58] Field of Search ................ 33/573, 567, 567.1, 33/568, 569; 29/464, 465, 468

[56] References Cited

U.S. PATENT DOCUMENTS

| | | | |
|---|---|---|---|
| 824,525 | 6/1906 | Bonney | 33/333 |
| 2,828,589 | 4/1958 | Hercik | 33/568 |
| 3,368,284 | 2/1968 | Boice | 33/567 |
| 3,554,060 | 1/1971 | Gargrave et al. | 29/465 |
| 3,565,161 | 2/1971 | Lindsey . | |
| 3,829,978 | 8/1974 | Basin et al. | 33/568 |
| 4,103,413 | 8/1978 | Malmberg | 29/465 |
| 4,359,915 | 12/1982 | Nascimento | 29/465 |
| 4,360,974 | 11/1982 | De Cuissart | 33/567 |
| 4,397,094 | 8/1983 | Nakamura . | |
| 4,555,840 | 12/1985 | Nakamura | 29/465 |
| 4,907,481 | 3/1990 | Dvorak et al. | 29/465 |
| 5,181,304 | 1/1993 | Piotrowski | 29/271 |
| 5,253,429 | 10/1993 | Konno et al. | 33/573 |

Primary Examiner—Christopher W. Fulton

[57] ABSTRACT

An inspection tool is disclosed that is used to accurately position an object to be inspected on the reference surface of a surface plate. The tool includes a first rail and a second rail having an end rigidly attached to the center of the first rail to form a T-structure. Each of the two rails includes an upwardly facing surface for receiving the object to be inspected. Threaded holes are formed in the opposite ends of the first rail and another threaded hole is formed in the free end of the second rail. Adjusting screws are arranged to extend through the threaded holes so that the ends thereof define a plane that is substantially perpendicular to the axes of the holes. The object to be inspected is placed upon the upwardly facing surfaces and the three screws adjusted to achieve a true parallelism of certain features on the object with the reference surface.

10 Claims, 5 Drawing Sheets

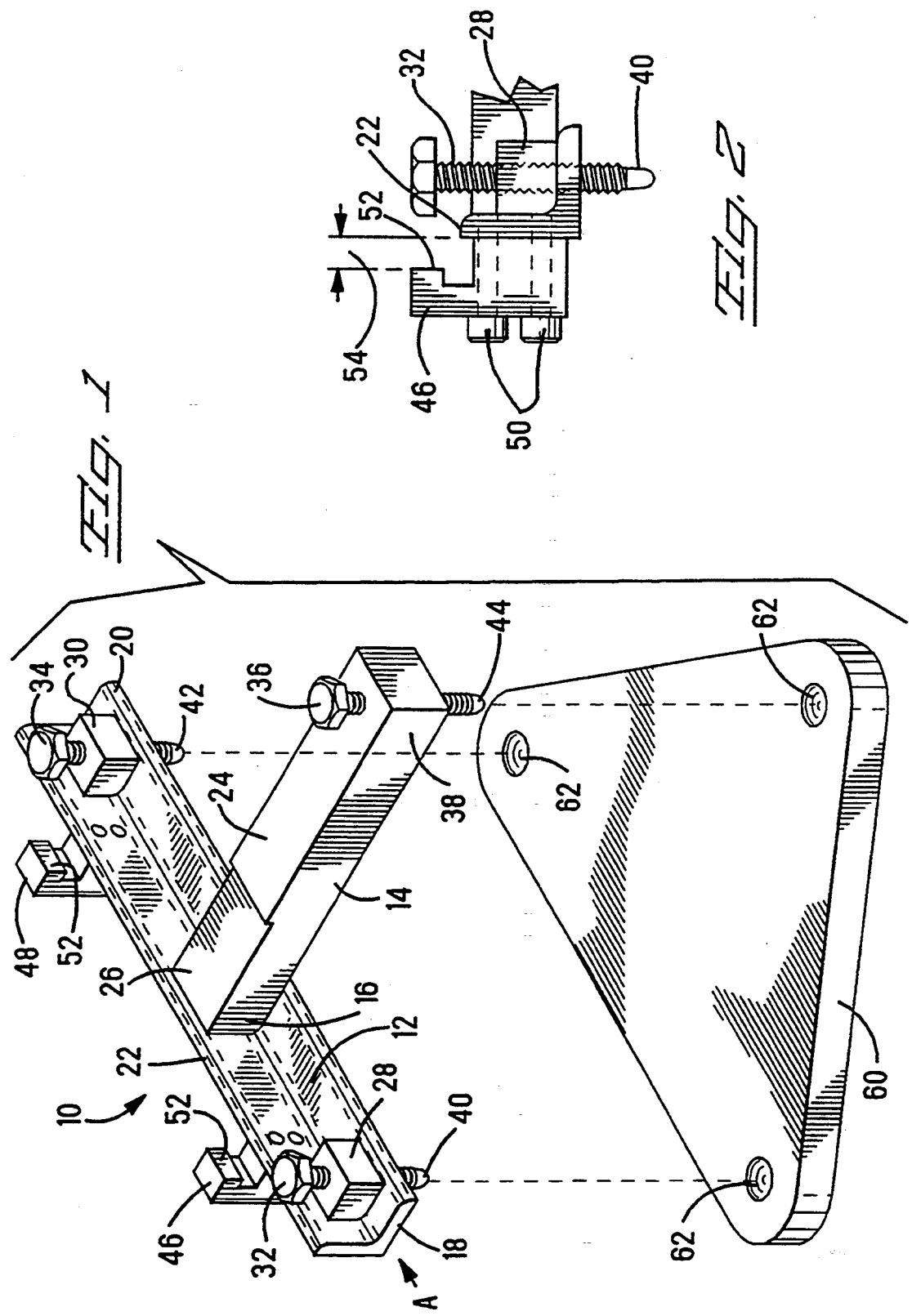

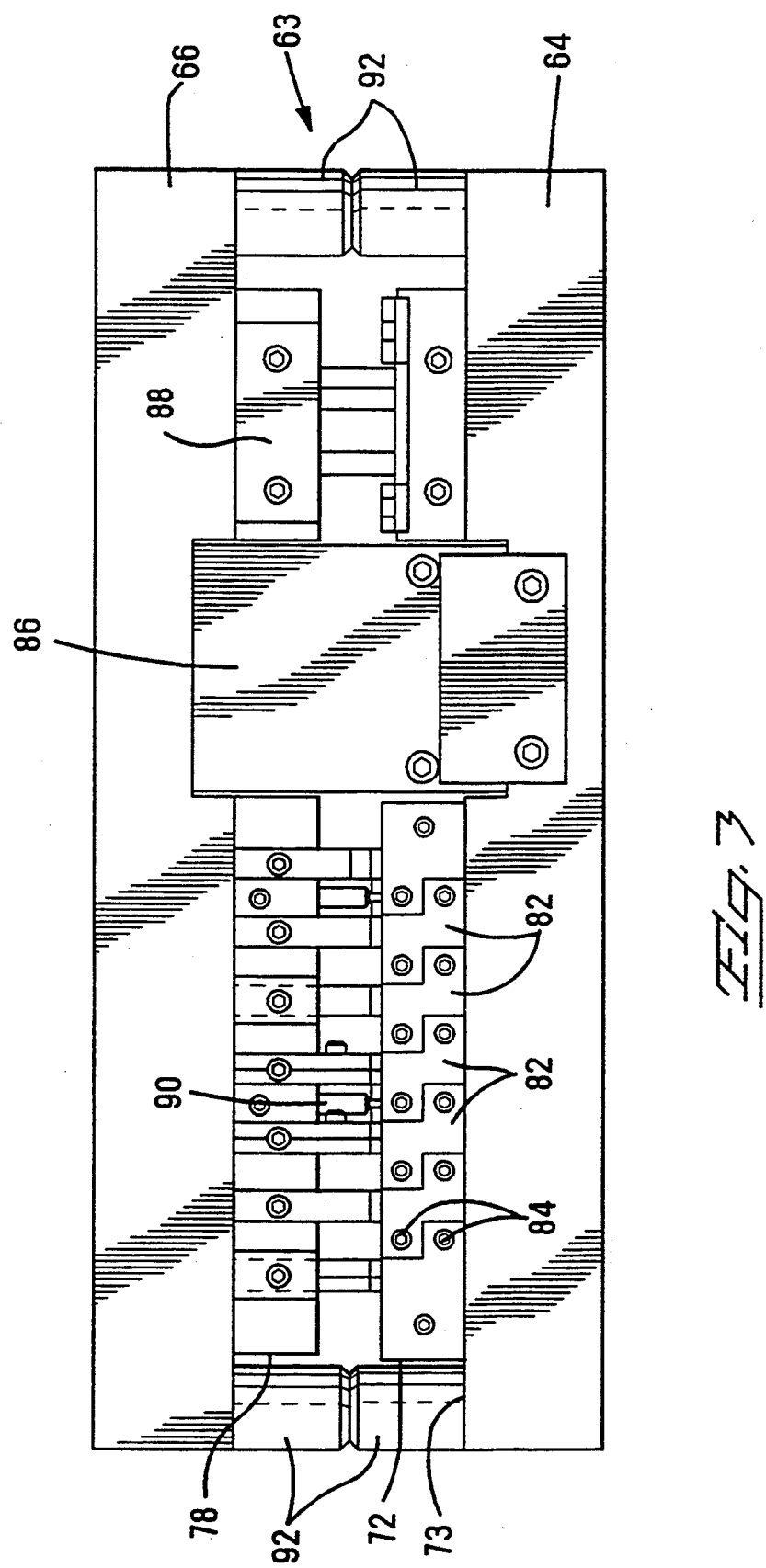

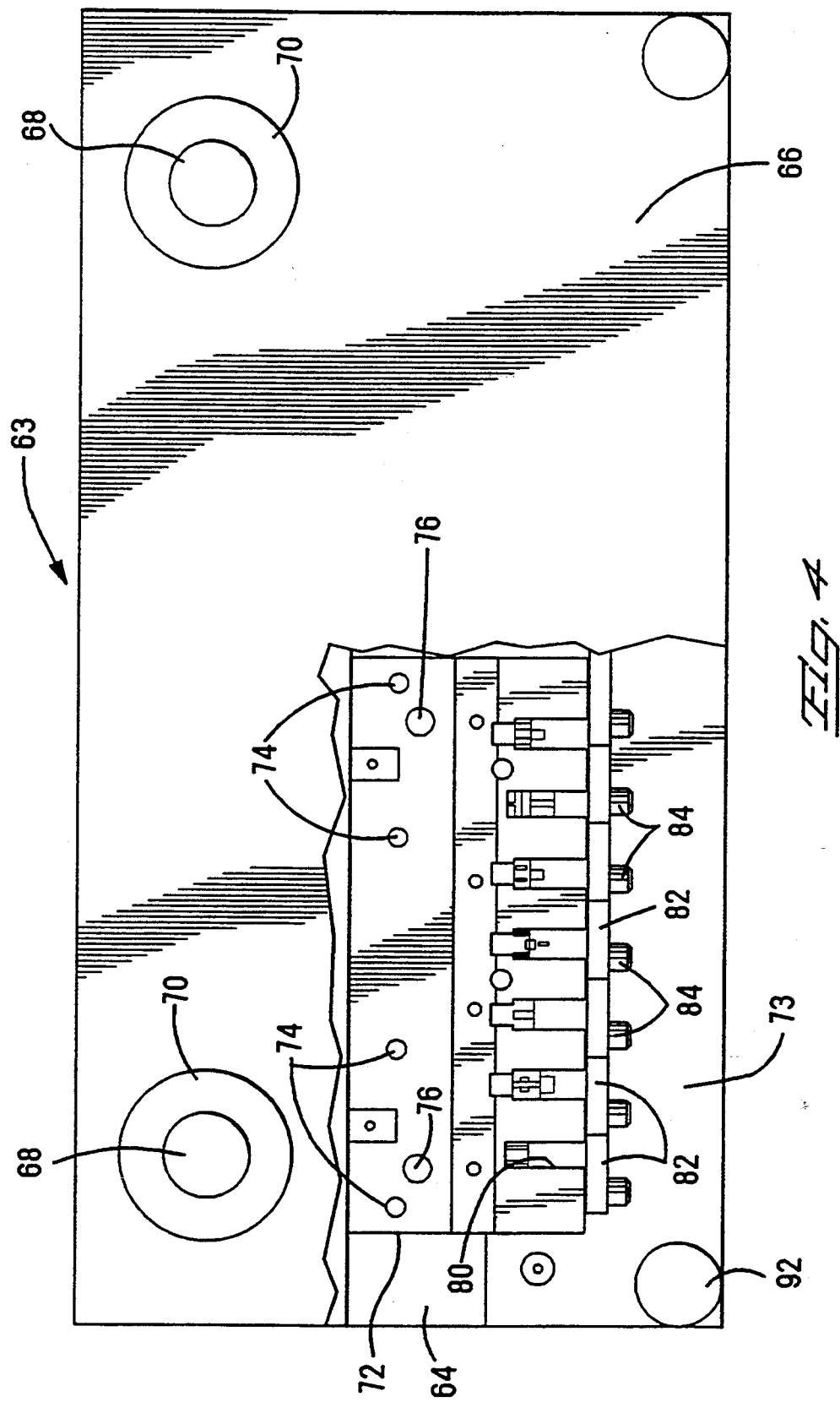

INSPECTION TOOL

The present invention is related to tools for positioning an object on a surface plate for inspection and measurement of various features of the object and more particularly for the inspection of a punch and die assembly.

BACKGROUND OF THE INVENTION

Punch and die assemblies used in high production stamping and forming operations must be periodically taken out of service and inspected for general wear or damage. This may be accomplished in either of two general ways. The punch and die tooling may be disassembled from the die shoes and individually inspected on a surface plate using standard tool room instruments, or the entire die shoe assemblies may be removed from the press and set up in an inspection machine side by side and optically scanned to perform the necessary measurements. The first method requires a significant amount of time to disassemble and then reassemble the parts while the second method requires a considerable capital investment in the inspection machine. The length of time that the tool is out of service has an adverse economic impact on the overall profitability of the operation, so it is desirable to minimize such unproductive time. What is needed is an inspection tool and method of use that does not require disassembly of the die shoe assemblies yet can be used to accurately position the assemblies on a reference surface for inspection using standard tool room instruments.

SUMMARY OF THE INVENTION

An inspection tool is disclosed for positioning an object relative to a flat reference surface so that various features on the object are parallel with or perpendicular to the reference surface for inspecting the accuracy of the features. The tool includes first and second elongated rails, each having an upwardly facing surface. The first rail has a first end and a second end. The second elongated rail has a free end and another end rigidly attached to the first rail between the first and second ends. Adjustable means is provided between the reference surface and each of the first, second, and free ends arranged so that the height of each of the ends above the reference surface can be independently varied. Therefore, when the object is placed upon the first and second elongated rails, the adjustable means can be manipulated to render the features on the object parallel with or perpendicular to the reference surface.

DESCRIPTION OF THE FIGURES

FIG. 1 is an isometric view of the inspection tool incorporating the teachings of the present invention;

FIG. 2 is a partial end view taken in the direction of the arrow A in FIG. 1;

FIG. 3 is a front view of a punch and die shoe assembly of the type that can be inspected with the present inspection tool;

FIG. 4 is a plan view of the assembly shown in FIG. 3;

DESCRIPTION OF THE PREFERRED EMBODIMENT

Figure 5:
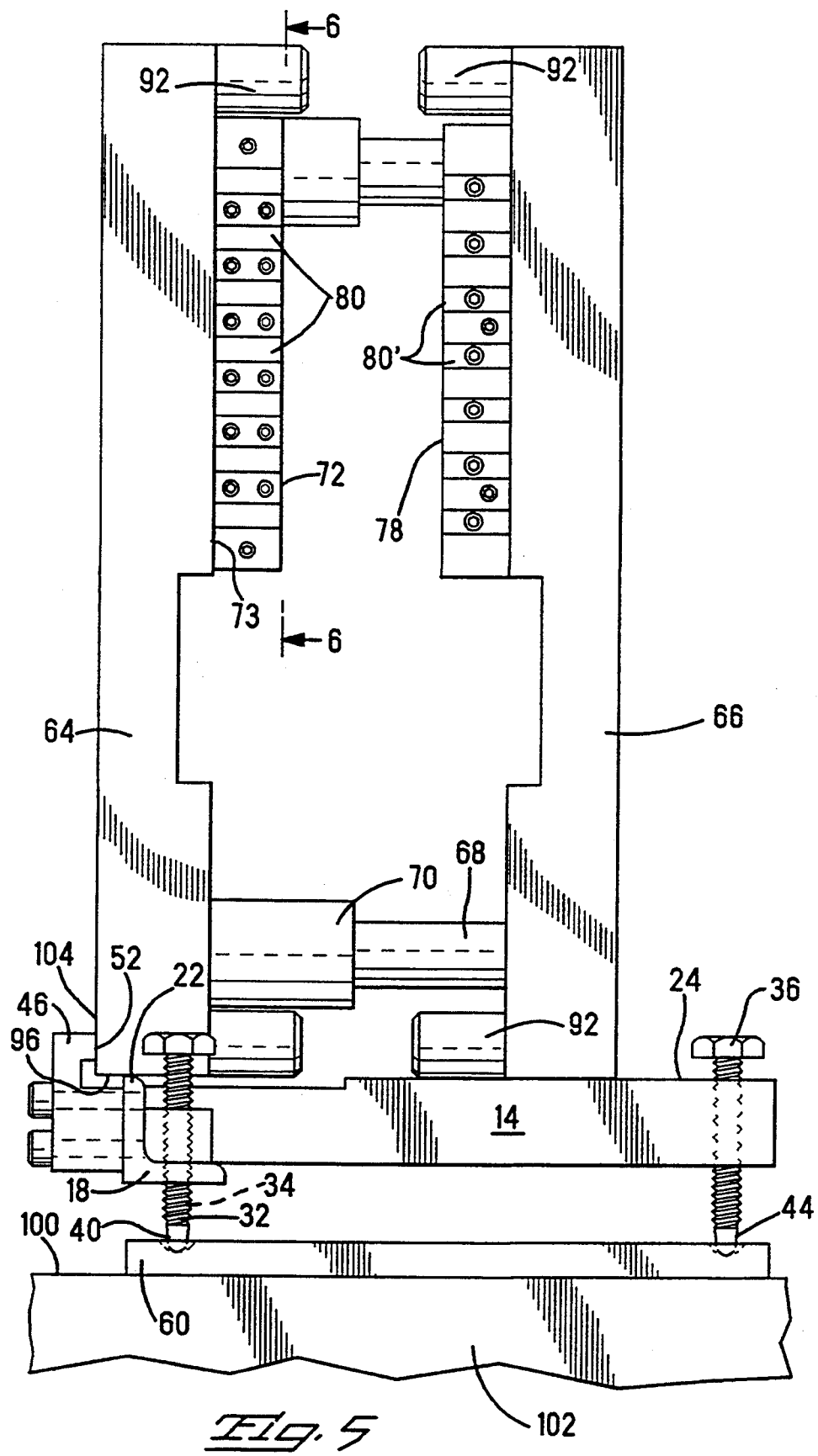
FIG. 5 is a front view of the present tool in operation.

There is shown in FIG. 1 an inspection tool 10 having an elongated first rail 12 with an L-shaped cross section and an elongated second rail 14. The second rail 14 has one end 16 rigidly attached to the first rail 12 at a point between the two ends 18 and 20. This attachment may be accomplished by suitable screws or, as in the present example, by welding. The first rail 12 has a relatively straight upwardly facing surface 22 that extends from the end 18 to the end 20. The second rail 14 includes an upwardly facing surface 24 that, in the present example, is approximately in a common plane with the surface 22. Art undercut 26 is formed in the surface 24 for clearance to assure that there is no interference when a die shoe is placed in position on the surface 22, as will be explained below. Alternatively, the surface 24 need not have the undercut 26 as long as the surface 24 is slightly below or offset from the surface 22. A pair of bosses 28 and 30 are welded to each end of the first rail 12, as best seen in FIG. 1. Three adjusting screws 32, 34, and 36 are threaded into holes in the bosses 28 and 30 and the free end 38, respectively. The axes of the three adjusting screws are mutually parallel and substantially perpendicular to the plane defined by the surfaces 22 and 24. The ends of the screws 32, 34, and 36 have radiused tips 40, 42, and 44, respectively. The three screws can be adjusted so that their tips define a plane that is substantially parallel with the plane defined by the surfaces 22 and 24. A pair of stop members 46 and 48 are attached to the side of the first rail 12 by means of screws 50 which are threaded into the first rail 12, as shown in FIGS. 1 and 2. Each stop member includes a banking surface 52 that is above the surface 22 and laterally offset therefrom by a distance 54. The stop members 46 and 48 are spaced apart a distance that is less than the width of the die shoe being inspected for a purpose that will be explained below. The tool 10 includes a buffer plate 60 having three indentations 62 spaced on identical centers with the three adjusting screws 32, 34, and 36. The buffer plate 60 is made of a hard plastic or other suitable material that will prevent marring of the surface plate by the tips 40, 42, and 44 of the screws when the tool is in use.

Before describing the operation of the inspection tool 10, a typical punch and die shoe assembly 63 will first be described. Such an assembly is depicted in FIGS. 3 and 4 where there is shown a die shoe 64 and a mating punch shoe 66 coupled together and maintained in alignment by means of two posts 68 rigidly attached to the punch shoe 66 and two mating ball bushings 70 rigidly attached to the die shoe 64 in the usual manner. The die shoe 64 is usually attached to the bed of a press and the punch shoe to the press ram to undergo reciprocating motion, during which the posts 68 ride within the mating ball bushings 70 and maintain the two shoes in precise alignment. A die block 72 is screwed and doweled to a mounting face 73 of the die shoe 64 by means of the screws 74 and dowels 76, while a punch block 78 is similarly attached to the punch shoe directly above and in alignment with the die block. Note that the partial cutaway shown in FIG. 4 shows the die block 72 with the punch block 78 removed. The die block 72 has a series of spaced slots 80 that are formed completely through the die block along the front edge thereof. Various stamping and forming die tools are arranged within these slots and secured in place with die clamps 82 that are screwed to the front edge of the die block 72 by means of the screws 84 that are threaded into the walls of the die block between the slots 80. Similarly, the punch block 78 has slots 80', not shown, that are in vertical alignment with the slots 80 and contain punch tools that mate with the die tools for effecting the desired stamping and forming operations. A pair of stop posts 92 are attached to the front corners of both the die shoe and the punch shoe, as shown in FIG. 3 and 4. The stop posts are arranged to mutually abut when the punch and die tools are fully engaged to prevent inadvertent further engagement that may damage the tools. The punch and die shoe assembly 63 includes a punch and die module 86, other punch tooling 88, as well as pilot pins 90 and other mechanisms that are not shown such as stripper plates and stock feed devices all of which are typically found in complex progressive dies. However, since the die and punch blocks 72 and 78 will be used to describe the operation of the inspection tool 10 these other tools and mechanisms need not be described further here.

In operation, the inspection tool 10 is positioned on a flat reference surface 100 which, in the present example, is the surface of a surface plate 102. The plastic buffer plate 60 is arranged between the screw tips 40, 42, and 44 and the surface 100 so that the screws do not damage the surface 100 in any way. The punch and die shoe assembly 63 is then positioned on the inspection tool 10 so that an edge 96 of the die shoe 64 is resting on the upwardly facing surface 22 of the first rail 12 and a corresponding edge of the punch shoe 66 is resting on the upwardly facing surface 24 of the second rail 14. The two shoes are spaced apart a convenient amount, however, the posts 68 are in full engagement with their respective ball bushings 70 so that mutual alignment is maintained. The die and punch tools are removed from their respective die and punch blocks 72 and 78 so that the slots 80 and 80' are open and available for inspection. The assembly 63 is positioned on the surfaces 22 and 24 so that locating surfaces 104 on the bottom of the die shoe 64 are against the banking surfaces 52. This assures that the bottom and top surfaces of the die shoe are parallel with the common centerline of the two adjusting screws 32 and 34.

Figure 6:
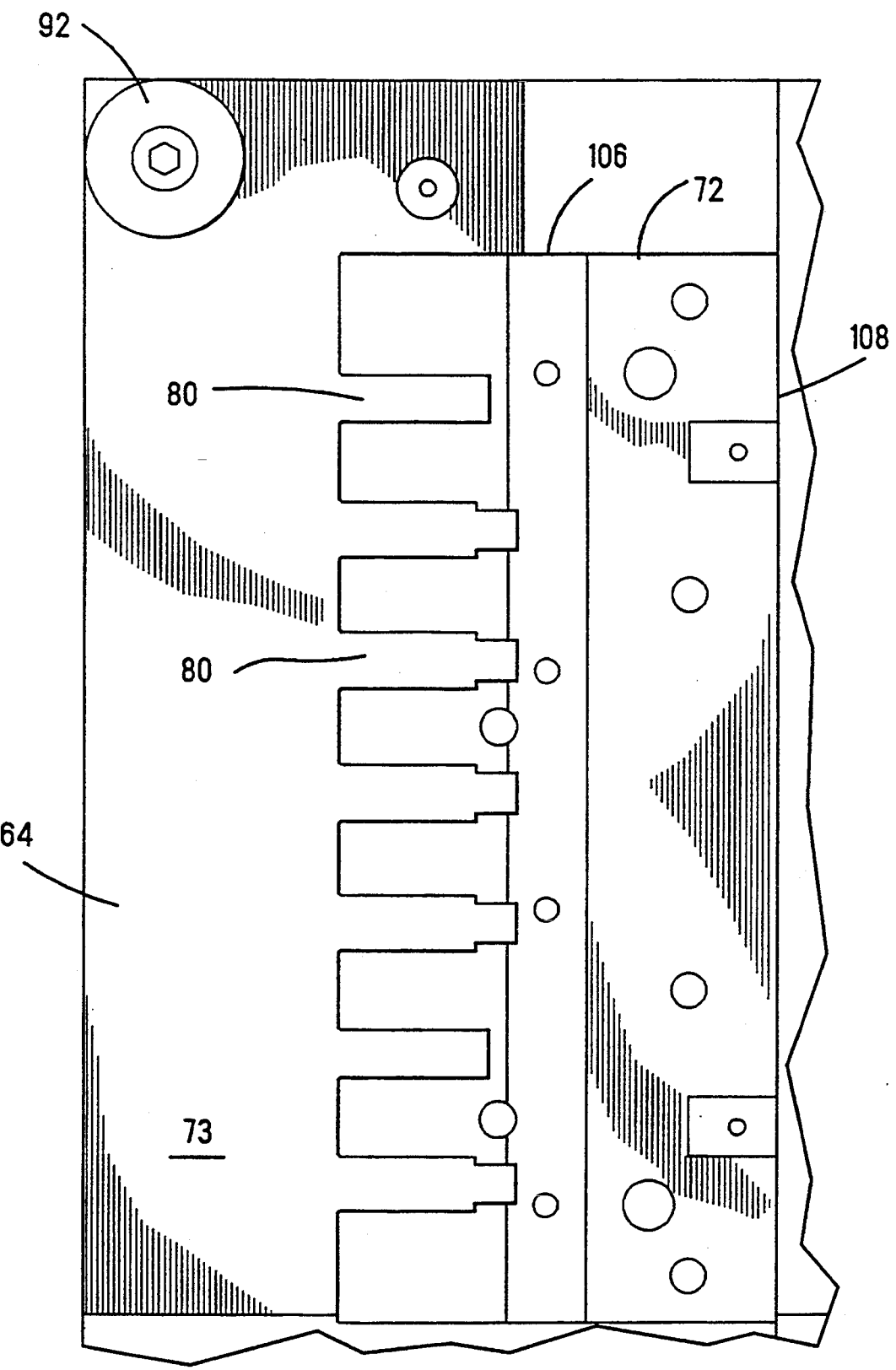
FIG. 6 is a partial cross-sectional view taken along the lines 6—6 in FIG. 5.

The tool 10 is then adjusted to bring the various surfaces of the die and punch blocks 72 and 78 into square with the reference surface 100. This is accomplished by using an electronic height gage, such as the Micro-Height-05. manufactured by Brown and Sharp Manufacturing Company of Precision Park, North Kingstown, R.I. 02882. The height gage having a dial indicator attached thereto is manipulated so that the indicator is run along a relatively long surface such as the surface 106 or 108, as seen in FIG. 6, to determine the direction of deviation from parallelism or perpendicularity of the surfaces 106 and 108, respectively, with respect to the reference surface 100. The surface on the die block chosen for this must be a surface that was used as a datum from which the dimension of the slots 80 were taken during the manufacture of the die block. In the present example, the surface 108 is used. The screws 32 and 34 are adjusted to tilt the first rail 12, and thereby tilt the punch and die shoe assembly until the surface 108 becomes perpendicular to the reference surface within a desired accuracy. The assembly 63 is then squared up in the other direction by choosing another surface that is perpendicular to the surface 108, such as the face 73 of the die shoe 64 and running the indicator vertically along that surface to determine the direction of deviation from perpendicularity and the screw 36 adjusted accordingly until the indicator indicates perpendicularity to the desired level of accuracy. This adjustment will tilt the tool 10 and punch and die assembly 63 about a first tilt axis defined by the points of contact of the screw tips 40 and 42 with the surface 100 without substantially altering the perpendicularity of the previously aligned surface 108, by virtue of the locating surfaces 104 being against the banking surfaces 52. The surface 108 is again checked for perpendicularity to the reference surface 100 and, if out of alignment, the screws 32 and 34 are again adjusted as desired. This adjustment will cause the tool 10 and assembly 63 to tilt about either a second tilt axis defined by the points of contact of the tips 44 and 42 with the surface 100 or a third tilt axis defined by the points of contact of the tips 44 and 40 with the surface 100, both of which define a tilt axis that is not perpendicular to the first tilt axis defined by the tips 40 and 42. Therefore, the previously aligned face 73 is tilted slightly out of alignment. This is corrected by simply repeating the previous step of aligning the surface 108, by again adjusting the screws 32 and 34, until the surface 108 is perpendicular to the reference surface 100 to the desired accuracy. Whenever either the screws 32 or 34 are adjusted to bring the surface 108 into alignment, the screw 36 must also be adjusted to correct the out of alignment of the surface 73 caused by the other adjustment. The above procedure will square up the entire punch and die shoe assembly 63 with respect to the reference surface 100 so that inspection of the detail features, such as the slots 80, can precede using standard measuring techniques and procedures. In the present example, parallelism of all of the walls of the slots 80 and 80' are determined as well as their exact spacing and their widths. Additionally, the relative alignment of each of the slots 80 to their respective slot 80' is also determined. In certain cases it may be advantagous to leave the punch and die tools secured within their respective slots 80' and 80 and perform direct measurement on the surfaces of these tools. It will be understood that the above described procedure has been applied to a relatively simple tooling example in the interest of clarity, however, it may be advantageously utilized while inspecting highly complex punch and die assemblies.

An important advantage of the present invention is that a significant amount of time can be saved, in setting up the punch and die tooling for inspection, over the prior art procedures. This is accomplished without the need for purchasing expensive inspection equipment.

I claim:

1. An inspection tool for positioning an object relative to a flat reference surface so that various features on said object are parallel with or perpendicular to said reference surface for inspecting the accuracy of said features comprising:
   (a) a first elongated rail having an upwardly facing first surface, a first end, and a second end;
   (b) a second elongated rail having an upwardly facing second surface, a free end, and another end rigidly attached to said first rail between said first and second ends; and
   (c) first, second, and third adjustable means coupled to said first end, second end, and free end, respectively, each means having a point of contact with said reference surface and arranged for independently varying the height of each of said ends above said reference surface, said points of contact of said first, second, and third adjustable means being the only points of contact with said reference surface, whereby when said object is placed upon said tool in engagement with said upwardly facing first and second surfaces, said first, second, and third adjustable means can be manipulated to render said features on said object parallel with or perpendicular to said reference surface.

2. The tool according to claim 1 wherein said points of contact of said first and second ends define a first tilt axis, said points of contact of said second and free ends define a second tilt axis, and said points of contact of said free and first ends define a third tilt axis, said three tilt axes being mutually non-perpendicular, whereby said first, second, and third adjustable means can be manipulated to tilt said tool about said three tilt axes to render said features on said object parallel with or perpendicular to said reference surface.

3. The tool according to claim 2 wherein said adjusting means comprises a threaded hole in a respective said end and an adjusting screw in threaded engagement therewith, each said adjusting screw having a tip in contact with said reference surface.

4. The tool according to claim 3 wherein the axes of said three screws are mutually parallel and substantially perpendicular to said reference surface when said inspection tool is in position on said reference surface and wherein each of said three screws includes an end extending below its respective first and second rail, said ends of said screws defining a first plane.

5. The tool according to claim 4 wherein said first and second surfaces define a second plain, said three screws being adjustable so that said first plane is substantially parallel with said second plain.

6. The tool according to claim 3 including a pair of banking surfaces associated with said first rail so that one banking surface is adjacent one end of said rail and the other banking surface is adjacent the other end thereof, said pair of banking surfaces being arranged above said upwardly facing first surface and laterally offset therefrom in a direction away from said second rail, said banking surfaces further being equidistant from a straight line extending through the centers of said two threaded holes in said first rail, said tool arranged so that when said object is positioned on said upwardly facing first and second surfaces, locating surfaces on said object can be located against said pair of banking surfaces.

7. A method of positioning an object relative to a flat reference surface by means of an inspection tool, said tool including:
 (a) a first elongated rail having an upwardly facing first surface, a first end, and a second end;
 (b) a second elongated rail having an upwardly facing second surface, a free end, and another end rigidly attached to said first rail between said first and second ends; and
 (c) first, second, and third adjustable means coupled to said first end, second end, and free end, respectively, and arranged for independently varying the height of each of said ends above said reference surface, said first, second, and third adjustable means being the only adjustable means for varying the heights of said ends above said reference surface, said method comprising the steps:
 (a) placing said tool on said reference surface with said first and second surfaces facing upwardly;
 (b) placing said object on said inspection tool so that a portion of said object is in supported engagement with said first surface and another portion of said object, spaced from said first portion, is in supported engagement with said second surface;
 (c) manipulating said first and second adjusting means until a first feature on said object is parallel with or perpendicular to said reference surface;
 (d) manipulating said third adjusting means until a second feature on said object that is substantially perpendicular to said first feature is parallel with or perpendicular to said reference surface; and
 (e) repeating steps (c) and (d) until both said first and second features are parallel with or perpendicular to said reference surface.

8. The method according to claim 7 wherein said tool includes a buffer plate and wherein step (a) includes placing said buffer plate between said first, second and third adjusting means and said reference surface.

9. The method according to claim 8 wherein said tool includes a pair of banking surfaces associated with said first rail so that one banking surface is adjacent one end of said rail and the other banking surface is adjacent the other end thereof and said object is a die shoe assembly having attached thereto mating punches and dies and wherein step (b) includes positioning two spaced locating surfaces on said die shoe against respective ones of said two banking surfaces on said tool.

10. The method according to claim 9 wherein step (d) is performed after each iteration of step (c).

* * * * *